METHOD OF SECURING CONDUCTOR TO STYLUS

Filed Aug. 15, 1952

INVENTOR
C. C. DAVIS
BY
J. F. McEneany
ATTORNEY

United States Patent Office 2,746,130

Patented May 22, 1956

2,746,130

METHOD OF SECURING CONDUCTOR TO STYLUS

Charles C. Davis, Los Angeles, Calif., assignor, by mesne assignments, to Westrex Corporation, a corporation of Delaware Application August 15, 1952, Serial No. 304,511

2 Claims. (Cl. 29—155.5)

This invention relates to phonograph recorders and more particularly to improvements in such recorders employing a heated cutting stylus.

It is known in the art of phonograph recording that considerable improvement may be obtained in the quality of a recording when heat is applied to the cutting stylus during a recording operation. Application of heat to the record-cutting stylus renders unnecessary the use of burnishing facets, thus permitting the use of a sharp or "featheredge" stylus which is more capable of recording short wavelengths. Also, as burnishing action is dependent upon record velocity, poor signal-to-noise ratio results at small record diameters. Therefore, the elimination of burnishing facets results in improved signal-to-noise ratio, the improvement increasing as the record diameter decreases.

In one known method of applying heat to the stylus, a coil of heater wire is wrapped around and cemented to the stylus. The wire coil is electrically connected to a source of heating current. When a coil of heater wire is applied to the stylus of an existing phonograph recorder in the manner described, the maximum improvement to be expected in the quality of the recording is not obtained. A considerable amount of the gain in quality expected as a result of employing a heated stylus is lost due to the fact that the mass of the coil which is added to the stylus assembly adversely affects the ability of this stylus assembly to respond accurately to the high frequency components of the signal to be recorded. The amount of this loss of high frequency response is a function of the ratio of the added mass of the coil to the mass of the stylus assembly.

It is an object of this invention to provide an improved method of and means for mounting an electrically energized heating coil in operative association with a record-cutting stylus whereby the existing frequency response characteristic of the stylus assembly will not be adversely affected.

It is usual practice for operators of phonograph recorders to periodically remove the record-cutting stylus for cleaning and sharpening. This cleaning operation cannot be carried out satisfactorily without removing the heater coil and, if this coil is cemented to the stylus in accordance with present practice, it is necessary to forcibly remove the coil from the stylus. This action damages the stylus to such an extent that in the majority of cases, it cannot be reused.

A further object of this invention is the provision of a method whereby a stylus heating coil may be attached to the stylus with a sufficiently strong bonding to prevent separation during recording but which may be readily broken to permit removal of the coil for stylus cleaning and sharpening.

In accordance with this invention, the heating coil and the lengths of wire extending therefrom to fixed electrical terminals are made from a single length of wire, the coil portion of which is pre-formed and placed on the stylus in light frictional contact therewith. The wire is selected as to quality and size such that when located in operative position, the lengths thereof extending from the ends of the coil portion to the terminals provide a sufficiently stiff support for the coil to maintain it constantly in light frictional contact with the moving stylus. Also by reason of its stiffness, the wire produces a reduction in the compliance of the stylus assembly an amount sufficient to compensate for the mass of the coil which has been added to this stylus assembly. As a result of this compensation, the resonant frequency of the stylus assembly remains unchanged and consequently the frequency response characteristic of the recording unit is not disturbed.

In accordance with a further novel feature of this invention, the coil portion of the heater wire may be more securely fixed to the stylus, if necessary, by a method which includes first covering the wire with a thin coating of enamel, pre-forming the coil therein, placing the coil in position on the stylus and finally passing an amount of current through the wire necessary to soften the enamel coating thereon to form a bond between the coil and the stylus. This method of securing the coil to the stylus elements eliminates the need for a cementing operation and the bonding between the stylus and the coil as formed by the softened enamel is sufficient to prevent separation of the coil from the stylus during operation but is not so great that it cannot be readily broken without injury to the stylus to permit cleaning and sharpening thereof.

These and other features of the invention will be more clearly understood from the following detailed description and accompanying drawings in which.

Figures 1, 2, 3:
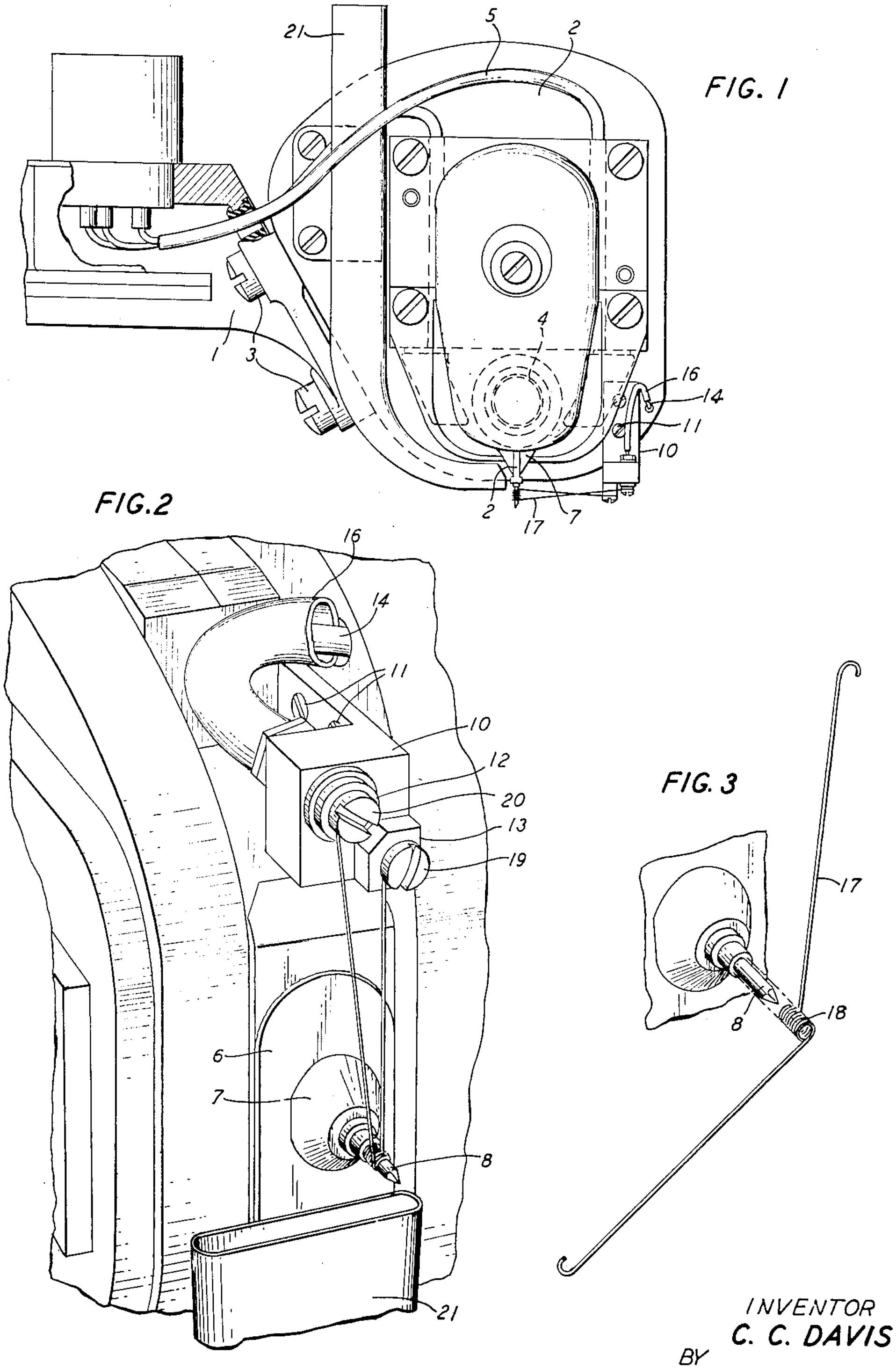
Fig. 1 is a view in front elevation of a phonograph recorder incorporating a stylus heating element in accordance with this invention.
Fig. 2 is an enlarged perspective view of the underside of the recorder of Fig. 1.
Fig. 3 is an enlarged view showing the manner in accordance with this invention of pre-forming the heater wire coil and applying it to the recorder stylus.

In the drawings the invention is shown as applied to an electrodynamic phonograph recorder of the type disclosed in United States Patent 2,531,242, November 21, 1950, G. R. Yenzer, in which a recorder arm 1 supports a recording unit 2. This recording unit includes a magnet system comprising a permanent magnet and associated pole-piece elements forming a magnetic air-gap, all as described in the above-mentioned United States patent to Yenzer. The magnet system is secured as a unit to arm 1 by machine screws indicated at 3. Within the air-gap formed by the magnet pole-pieces there is disposed a coil generally indicated at 4, Fig. 1. This coil 4 is resiliently mounted to be movable in the air-gap in response to signal current applied thereto from a signal source through connection 5.

The moving coil 4 together with a stylus holder 7 and a stylus 8 forms a stylus assembly which is movable relative to the magnet system mounted on arm 1. In the design of this moving stylus assembly the mass, compliance and resistive components have been carefully proportioned to obtain a desired frequency response characteristic for the frequency range of the sounds to be recorded. A change in any one of the proportioned components will adversely affect the frequency response characteristic of the recorder. For example, the addition of mass to the stylus assembly will adversely affect the ability of the stylus assembly to respond to the high frequency component of the signal to be recorded unless a compensating change is made in one or both of the other components. Therefore, the addition to the stylus assembly of the mass of a heating coil in accordance with the present practice of cementing the coil to the stylus, produces an undesired change in the frequency response characteristic of the recorder and the full advantage obtainable by the use of a heated stylus cannot be realized unless further changes are made in the design to compensate for the added mass.

In accordance with this invention a bracket 10, secured to a pole-piece element of the magnet assembly by means of machine screws 11, is provided with terminals 12 and 13. Terminal 12 is electrically insulated from the bracket 10 by an insulating washer 14. An insulated wire 15 connected at one end to an alternating-current source is secured to the terminal 12. The terminal 13 is in direct contact with the bracket 10 which is, in turn, connected to the recorder case which serves as the return lead from the terminal 13 to the alternating-current source. A heat insulating covering 16 may be provided for wire 14 within the recorder unit as shown.

In accordance with this invention a single continuous length of heater wire 17 is pre-formed into a coil 8 intermediate its ends as shown in Fig. 3. In the particular recorder as shown in the drawings, the wire 17 is preferably of 0.005" in diameter and the coil formed therein comprises 7½ turns of the wire. The inside diameter of the preformed coil is such that the coil can be placed on the stylus shank with light pressure to produce only slight frictional contact between the coil and stylus.

After the coil 18 is placed on the stylus 8 in the manner described, the right-hand lead is attached to terminal 13 by screw 19. The left-hand lead is then urged in a clockwise direction and secured to terminal 12 by means of screw 20. Care must be exercised in securing the lead to terminal 12 to insure that the coil is not deformed to thus place an excessive pull on the stylus. The coil 8 when properly applied to the stylus will, in most applications, stay in place thereon without appreciable tension in the leads.

The wire 17 in any application in accordance with this invention is chosen to have a stiffness such that the leads from the coil 18 to the terminals 12 and 13 will not only support the coil on the moving stylus under the condition of light frictional contact but in addition will reduce the compliance of the stylus assembly an amount sufficient to compensate for the added mass of the coil 18 to thus maintain the original frequency response characteristic of the recorder.

A suction tube 21 is provided and is operated while the heating coil 18 is energized during a recording operation to dispose of burned chips which might otherwise adhere to the stylus.

In the application of a heating coil in accordance with this invention to the stylus of existing phonograph recorders of a design other than that disclosed in the drawings, it might be found desirable to increase the contact between the coil and the stylus without increasing the wire stiffness in order to prevent separation of these elements during operation. The application of a cementing material between the coil and stylus in accordance with present practice is not desirable for many reasons, one of which has been discussed hereinabove.

In accordance with this invention applicant provides a novel method by means of which the coil may be efficiently bonded to the stylus without resorting to the use of cementing material. In accordance with this method, the entire length of heating wire 17 or only the portion thereof to be pre-formed into a coil, is covered with a thin coating of enamel which is allowed to harden on the wire. The wire is then pre-formed into the coil as described above and placed in operating position on the stylus with the leads connected to the terminals. Current in an amount normally in excess of that used during operation but sufficient to produce a softening of the enamel covering of the wire on the coil, is passed through the heating wire. The softened enamel will produce a bonding between the coil and the stylus sufficient to provide for the additional holding force necessary to prevent separation of these elements during the recording operation. Also, the enamel adhering to the stylus when the coil is removed may be more readily separated from the stylus than can the cementing material now used.

The novel features in accordance with this invention provide for the realization of the maximum improvement obtainable by the use of a heating element associated with the stylus of an existing recorder having a desirable frequency response characteristic.

What is claimed is:

1. In a phonograph recorder having a recorder head, a record-cutting stylus resiliently mounted from said head to be movable relative thereto in response to signal currents and a stylus heating element in the form of an electrically energized conductor coiled around said stylus, the method of securing said conductor to said movable cutting stylus to prevent separation therebetween during a recording operation which comprises applying a thin coating of enamel to said conductor, permitting said coating to harden on said conductor, coiling said conductor around and in frictional contact with said stylus, applying an electrical current to said conductor sufficient to soften the enamel coating thereon, discontinuing the application of said current, and permitting said enamel to harden to form a bonding between said conductor and said stylus.

2. In a phonograph recorder having a recorder head, a record-cutting stylus resiliently mounted from said head to be movable relative thereto in response to signal currents and a stylus heating element in the form of an electrically energized conductor coiled around said stylus, the method of securing said conductor to said movable cutting stylus to prevent separation therebetween during a recording operation, which comprises applying to said conductor a coating of heat-softenable solid material which possesses adhesive properties in its softened state, coiling said conductor around and in close proximity to said stylus, applying an electrical current to said conductor sufficient to soften the coating thereon, discontinuing the application of said current, and thereafter permitting said coating to solidify to form a bond between said conductor and said stylus.

References Cited in the file of this patent

UNITED STATES PATENTS

| | | |
|---|---|---|
| 1,163,659 | Hadaway | Dec. 14, 1915 |
| 1,969,256 | Clark et al. | Aug. 7, 1934 |
| 2,109,109 | Finch | Feb. 22, 1938 |
| 2,516,919 | Royston | Aug. 1, 1950 |
| 2,531,242 | Yenzer | Nov. 21, 1950 |
| 2,629,922 | Finch | Mar. 3, 1953 |

FOREIGN PATENTS

| | | |
|---|---|---|
| 759,552 | France | Nov. 23, 1933 |